June 7, 1960

R. A. WELLER ET AL 2,939,542

INSTRUMENT FOR MEASURING RADIATION PRESSURE
FROM A SOUND TRANSMITTER

Filed March 19, 1956

INVENTORS:
ROBERT A. WELLER &
HORACE T. FINCH.

BY: R. E. Giauque

ATTORNEY.

June 7, 1960

R. A. WELLER ET AL 2,939,542

INSTRUMENT FOR MEASURING RADIATION PRESSURE
FROM A SOUND TRANSMITTER

Filed March 19, 1956

INVENTORS:
ROBERT A. WELLER &
HORACE T. FINCH.

BY: R. E. Giauque

ATTORNEY.

United States Patent Office 2,939,542
Patented June 7, 1960

2,939,542

INSTRUMENT FOR MEASURING RADIATION PRESSURE FROM A SOUND TRANSMITTER

Robert A. Weller, West Covina, and Horace T. Finch, Arcadia, Calif., assignors to The Birtcher Corporation, Los Angeles, Calif., a corporation of California Filed Mar. 19, 1956, Ser. No. 572,253

1 Claim. (Cl. 181—.5)

This invention relates to an instrument for measuring radiation pressure from a sound transmitter and more particularly to an instrument for measuring ultrasonic radiation pressure wherein the radiation pressure acts solely against the force of gravity on a pendulous weight so that the scale of the instrument can be calibrated directly in terms of mass.

In general, the instrument of the present invention utilizes a parallelogram linkage mechanism having four rigid arms pivotally connected together with one pivot fixed to the casing of the instrument. One arm of the linkage supports the radiation target which receives the radiation pressure and this arm is restricted by the linkage to move in the direction of radiation so that the target is continually transverse to the direction of radiation. The instrument casing is filled with a sound transmitting liquid, such as water, which has a buoyancy effect on the target, and the parallelogram linkage also has a counterbalance weight connected thereto so that the linkage can be perfectly counterbalanced about the fixed pivot by compensating for the difference between the weight of the target and the buoyance experienced by the target. A pendulous weight is also rigidly fixed to the linkage for movement about the fixed pivot so that the target must move against the weight under the influence of radiation pressure. The distance of the weight from the fixed pivot is adjustable so that the sensitivity of the instrument can be changed by moving the weight or by substituting a weight of different mass. Because of the fact that the target moves only against gravity, a substantially linear calibration of the scale of the instrument can be utilized and the same scale can be used in all instruments. Precision ball bearings and other antifriction connections are utilized for the pivots between the arms of the parallelogram linkage so that friction plays no important part in the displacement of the target resulting from radiation pressure. In order to set the instrument at the zero reading, the casing and scale of the instrument can be tilted relative to the linkage until the indicator attached to the linkage is positioned opposite the zero mark on the scale. In other words, since the parallelogram linkage is counterbalanced, the pendulous weight will hold the target and parallelogram linkage as the casing and scale are moved relative thereto until the zero calibration is obtained. Thus, the present invention provides an instrument in which radiation pressure can be calibrated directly to mass as represented by the pendulous weight attached to the parallelogram linkage and each instrument can utilize the same calibration.

Heretofore, it has been proposed to obtain a measurement of sound radiation pressure by suspending a target in a closed liquid body by means of a rhomboid system incorporating flexible ribbons which twist under the impact of the pressure upon the target. Four such flexible ribbons are required to mount the target in such a way that it is restricted to movement in the direction of the radiation pressure. The calibration of such an instrument is wholly dependent upon the combined resistance of the ribbons in opposition to the movement of the target and in order to counterbalance the weight of the target, it is necessary in such a system to adjust the initial torque of one of the ribbons by means of counterweights. Thus, one ribbon has inherently different operational characteristics from the other ribbons during changes in the position of the target. Also, it is necessary to twist one of the ribbons in order to adjust the instrument to the zero reading and this adjustment likewise affects the operational characteristics of the ribbon with the result that all ribbons will not come into action at the same time or with the same effect. Since the weight of the target in such instruments can vary from instrument to instrument and the characteristics of the ribbons can also vary, it is understandable that the compensating torques placed upon the rhomboid linkage of each instrument will vary from instrument to instrument and thus, it is impossible to utilize the same scale calibration for all instruments and obtain accurate pressure measurement. The instrument of the present invention overcomes the difficulties in such prior instruments since the target moves solely against the force of gravity on a pendulous weight and therefore, accurate measurements can be obtained in all instruments from the same scale calibration and it is only necessary to tilt the casing and scale of the instrument to set the zero reading.

It is therefore an object of the present invention to provide an instrument for measuring sound radiation pressure, which utilizes a target acting directly against a pendulous weight so that measurements of the instrument can be directly calibrated in terms of mass.

Another object of the present invention is to provide an instrument for measuring sound radiation intensity in which a target is carried by a parallelogram linkage provided with a counterweight to accurately balance the weight of the target against the flotation effect upon the target of the surrounding sound transmitting liquid so that the weight of the target will not affect the measurements of the instrument.

A further object of the present invention is to provide a measuring instrument target positioned within a liquid filled casing and having a pendulous mass connected with the linkage supporting the target so that the target moves against the pendulous mass to provide a measurement in terms of weight, said target comprising two sides forming a right angle with the apex nearest the sound transmitter so that the effect of sound pressure reflected from each side cancels out.

Another object of the present invention is to provide a measuring instrument having a target movable against a pendulous weight to measure radiation pressure and a pointer connected with the target and coacting with a scale carried by the casing of the instrument so that the zero calibration can be obtained by tilting the casing relative to the pointer.

These and other objects of the invention not specifically set forth above will become readily apparent from the accompanying description and drawings in which:

Figure 4 is a horizontal section along line 4—4 of

Figure 2:
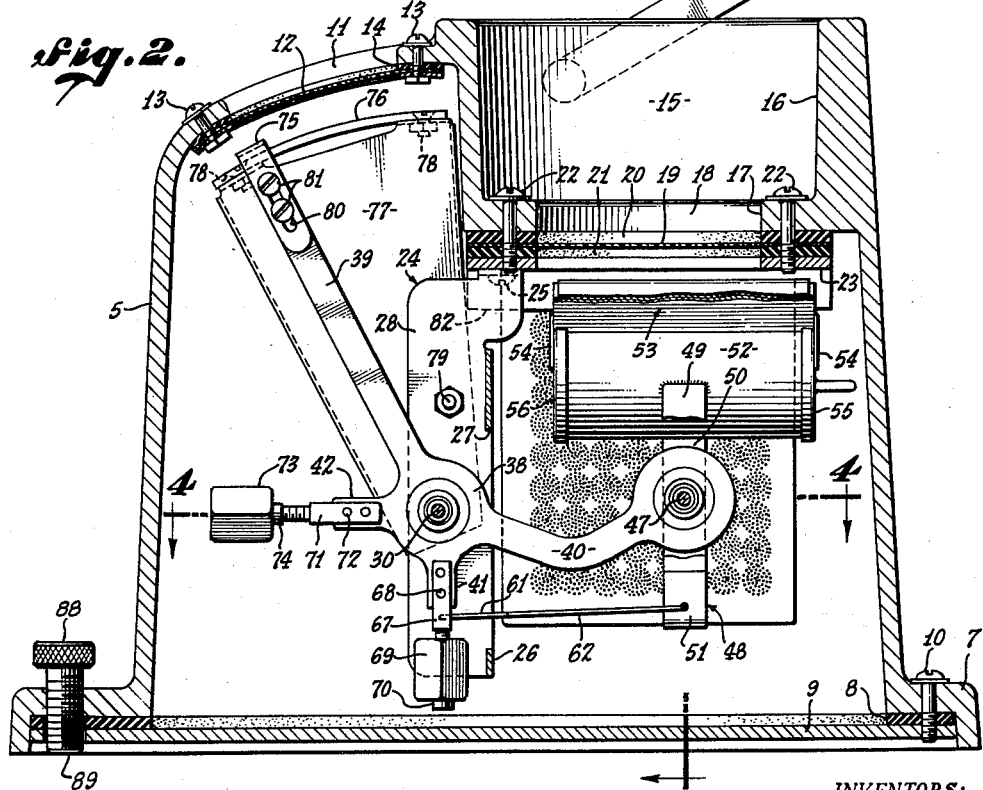
Figure 2 is a vertical section along line 2—2 of Figure 1 illustrating the target for the instrument carried by one arm of the linkage mechanism and showing the attachment of the counterweight and pendulous mass to the linkage mechanism.
Figure 3:
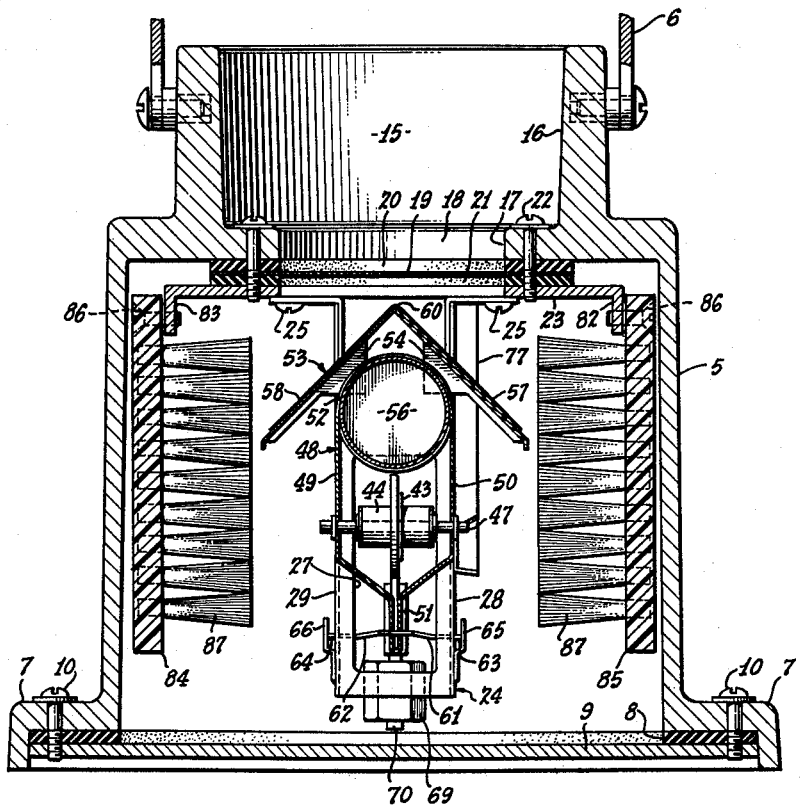
Figure 3 is a transverse vertical section along line 3—3 of Figure 2 showing the angular target positioned below the sound transmitting diaphragm and illustrating the manner in which the absorbing brushes are mounted to absorb the energy reflected from the target.

Figure 2 showing the construction of the linkage mechanism and the manner in which this mechanism is supported by the casing of the instrument.

Figure 1:
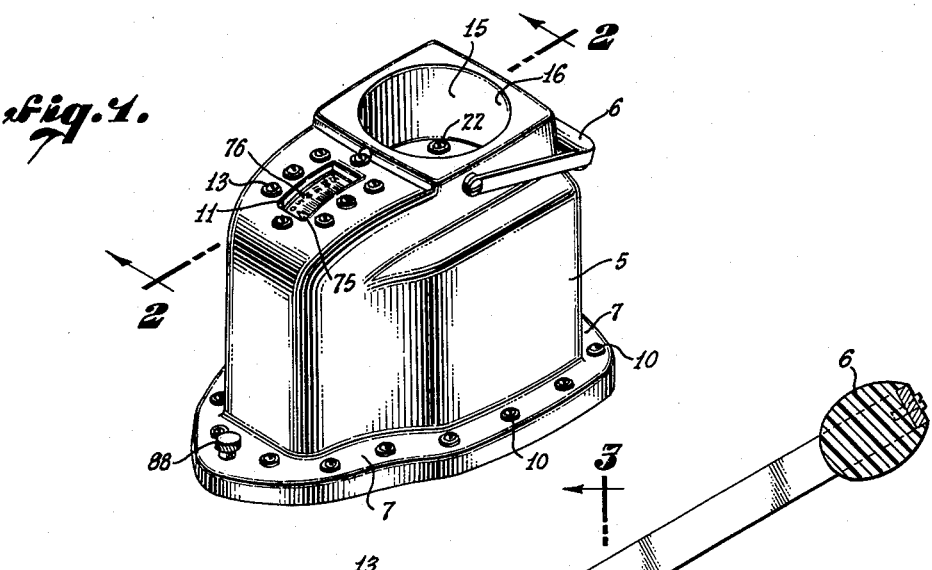
Figure 1 is a perspective view of the instrument of the present invention showing the fluid tight casing and the scale attached to the casing.

Referring to Figure 1, one embodiment of the present invention comprises a casing 5 equipped with a carrying handle 6 which is pivotally attached to the casing. The measuring components of the instrument are contained within casing 5 which is filled with a sound-conducting liquid, such as degasified distilled water. A flange 7 is carried at the lower edge of the casing and receives gasket 8 and bottom 9, which is securely held to the flange by a plurality of bolts 10 and sealed by gasket 8 to make the bottom of the casing fluid tight. Since the container is completely filled with a liquid, it is desirable to have the container formed of a material, such as fibre board or plastic, which has the same coefficient of expansion as the sound-conducting liquid within the casing so that it is unnecessary to have an expansion chamber for the casing.

The casing 5 contains an opening 11 covered by a layer 12 of rigid transparent material which is secured around the edge of opening 11 by a plurality of bolts 13 and a gasket 14 is positioned between the material 12 and the casing in order to provide a water-tight seal for the opening 11. The transparent material 12 makes it possible for the scale and indicator of the instrument to be read from the exterior of the instrument. Casing 5 also has a circular cavity 15 formed by wall 16 which has a circular flange 17 forming a circular opening 18 in the casing. A diaphragm 19 covers the opening 18 and is held between two gaskets 20 and 21 which are held tightly against the undersurface of the flange 17 by means of screws 22 threaded to mounting plate 23. By tightening the screws 22, the mounting plate 23 is pulled towards the casing to exert pressure on the gaskets 20 and 21 so that the gaskets together with the diaphragm 19 form a liquid-tight seal for opening 18. The cavity 15 and flange 17 are of suitable size to receive and support a sound-transmitting unit which develops the radiation pressure to be measured and the opening 15 also contains a sound-transmitting liquid, such as water, in order to conduct the sound pressure from the transmitting unit to the interior of the casing 5 through the diaphragm 19. This diaphragm may be constructed of any suitable thin sound-transmitting material or the diaphragm can be made of a thickness of multiples of half waves of the sound wave in the material in order to obtain maximum transmission of the radiation pressure through the diaphragm. It is understood that the cavity 15 will conform to the outer surface of the transmitting unit and that the transmitting unit can be supported in position by the flange 17.

Figure 4:
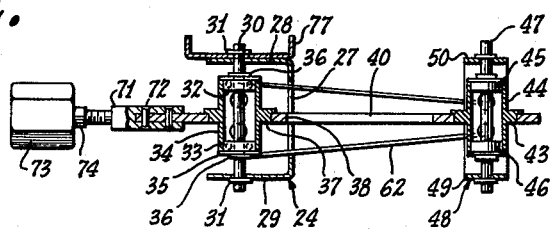

Referring now to the measuring components of the instrument and to their construction, a channel-shaped bracket 24 is secured by screws 25 to the underside of the mounting plate 23 and extends vertically downward in the casing. The bracket 24 includes a bottom member 26 containing an opening 27, and two sides 28 and 29. A support shaft 30 extends through openings in sides 28 and 29 and is held rigidly in these sides by lock washers 31 (see Figure 4). The shaft 30 supports ball bearings 32 and 33 which serve to rotatably support a cylindrical member 34 which has end members 35 held in position by lock washers 36 and the cylindrical member 34 has a flange 37 which is rigidly secured in an opening in hub 38. Thus, the shaft 30 represents the pivot of the linkage mechanism, which is fixed to the casing. The hub 38 has four arms 39, 40, 41 and 42 formed integral therewith and extending in a different direction. The arm 40 has an opening at its end for rigid attachment to flange 43 of cylindrical member 44 which is rotatably supported in the same manner as cylindrical member 34 by means of ball bearings 45 and 46 supported by shaft 47. A bracket 48 is secured to the shaft 47 for rotation with respect to arm 40 and this bracket comprises sides 49 and 50 and an end projection 51. The upper ends of arms 49 and 50 are welded or otherwise secured to a flotation tank 52 which in turn supports the target member 53 since flanges 54 of the target member are welded to opposite ends 55 and 56 of the flotation tank. The bearings carried by shafts 30 and 47 for the cylindrical members 34 and 44, respectively, can be of any suitable type which develops minimum friction upon relative rotation.

The target member 53 is comprised of sides 57 and 58, each formed of a double layer of metal or other suitable material having an air space therebetween to provide full sound reflecting qualities. The sides are positioned to form a 90 degree angle therebetween with the apex 60 located adjacent the diaphragm 19 and in a plane perpendicular to the direction of sound radiation through the diaphragm 19. The sides 57 and 58 are positioned so that each side forms an angle of 45 degrees with the direction of sound radiation and each side has the same area to receive the same amount of pressure radiation from the sound transmitter. Since the sound waves are reflected by the sides at 90 degrees to the direction of propagation, formation of standing waves of incoming radiation are prevented and the reactive component of sound pressure on the target will be exclusively in the direction of the sound radiation since the effect of the reflection from each side of the target cancels out. The end projection 51 of bracket 48 has an opening for pivotal connection with the end of a bent wire formed into two arms 61 and 62. The free ends 63 and 64 of the arms 61 and 62, respectively, are inserted in openings in sides 28 and 29, respectively, of bracket 24 and these openings are covered by shields 65 and 66, respectively, so that the ends of the arms will be pivotally mounted in the sides of the bracket. Since the wire arms 61 and 62 are pivotally connected to the fixed bracket 24 and to bracket 48 and since the shaft 30 is held rigid with the frame by means of the bracket 24, it will be apparent that bracket 48 will remain vertical during movement of target member 53 and the target member will retain its orientation with respect to the direction of the pressure radiation even though the target moves sidewise with respect to the bracket 24. It is pointed out that this movement of the target is obtained because of the fact that the effective length of the arm 40 is the same as the effective length of the arms 61 and 62. The sound transmitter will transmit sound only through the central portion of diaphragm 19 and the sides 57 and 58 are large enough so that in any position of the target member, the sides will receive the same area of pressure radiation.

The arm 41, attached to hub 38, receives a fork-shaped member 67, which is secured thereto by pins 68 and arm 67 is threaded to receive a weight 69. The weight can be adjusted in position along the threaded portion of member 67 and can be secured in a desired location by thread clamp 70, carried at the lower end of the weight. The arm 42, also connected with hub 38, receives a forked member 71 which is secured thereto by pins 72 and the arm has a threaded section which receives a weight 73 which can be fixed in any position along the threads by the gripping portion 74. The remaining arm 39, attached to hub 38, carries a pointer 75 extending partially across a scale 76 which is secured to and supported by a bracket 77 by means of screws 78 passing through upper flanges on the bracket. The bracket 77 is rigidly secured to the side 28 of bracket 24 by means of bolt 79 and also by one end of shaft 30 which passes through both the side 28 and the bracket 77. The position of pointer 75 relative to the scale 76 can be adjusted by means of a slot 80 in the pointer arm which can be moved relative to the set screws 81 carried by the arm 39. It is pointed out that as the target member 53 is moved under radiation pressure, the movement of arm 40 will be transmitted to the arm 39 to indicate a change in the radiation pressure by moving the pointer 75 over the scale 76.

The weight 73 is utilized as a counterbalance weight in order to balance out the weight of the target and of the linkage system against the buoyance effect of tank 52. The weight 73 can be varied in size and in its position along the forked member 71 in order to obtain an exact balance of the linkage mechanism about the fixed pivot point at shaft 30. The weight 69 is a pendulous mass which acts about the axis of shaft 30 and normally hangs vertically downward so that the pointer 75 indicates zero on the scale 76. Any downward movement of the target member 53 will cause the weight 69 to swing upwardly about the axis of shaft 30 and exert on the target member 53 a force in opposition to the radiation pressure. It is apparent that the higher the weight 69 is moved, the greater will be the force available to counterbalance radiation pressure. Thus, the radiation pressure will act directly against the force of mass 69 on the linkage mechanism and since the force developed by the mass in its movement about shaft 30 increases substantially linearly, it is possible to calibrate the scale 76 in a linear manner.

The mounting plate 23 has flanges 82 and 83 at opposite sides which serve to support, respectively, brushes 84 and 85 by means of screws 86. These brushes extend vertically downward along the sides of the casing 5 and are opposite the sides 57 and 58, respectively, of the target member 53. The brushes serve the purpose of absorbing the radiation pressure which is reflected at an angle from the sides of the target member in a direction normal to the face of the brushes. The bristles 87 of the brushes 84 and 85 can be constructed of any suitable fibres, formed of either plastic or other suitable materials. Because of the fact that all of the sound energy passing through the diaphragm 19 is reflected from the target member 53 into the brushes 84 and 85, it is impossible for standing sound waves to develop in front of the target member. Therefore, only the true radiation pressure of the incoming sound waves will act against the target member since the components of the pressure reflected from the target directly oppose each other at 90 degrees to the direction of radiation so that no resultant torque develops on the target.

The operation of the measuring instrument will now be briefly described and it is understood that the instrument is particularly adapted for measuring ultrasonic radiation pressure. If no sound radiation is transversing the diaphragm 19 from the transmitter located in cavity 15, the pendulous mass 69 will hang vertically downward and the pointer 75 will be at the zero indication on the scale. In the event that the pointer 75 does not read zero when the pendulous mass hangs vertically downward, the complete casing 5 can be tilted relative to the pendulous mass 69 in order to initially set the pointer at the zero reading. For this purpose, a set screw 88 is located in the flange 7 at the front of the instrument and has an end 89 which can engage the support surface for the instrument. By rotating the screw, the complete casing 5 can be tilted in one direction or the other to move the scale 76 relative to the pointer 75 until the pointer is at the zero line. Thus, it is unnecessary to adjust the counterweight 73 to obtain the zero calibration of the instrument and any difference between instruments can be quickly and easily compensated for. When sound pressure passes through the diaphragm 19 from the transmitter, the target member 53 will move downwardly and remain oriented with the direction of radiation. The downward movement will terminate when the pendulous mass 69 has moved about the axis of shaft 30 an amount to produce a force on the linkage mechanism equal to the radiation pressure and, of course, the downward movement will cause the pointer 75 to move along the scale 76 and indicate the true value of the radiation pressure in units of watts, which can be directly related to the mass of weight 69. Also, during movement of the target member 53, the counterweight 73 will move with the linkage mechanism so as to balance the measuring system at all times. In the event that radiation pressure decreases, the target member will move upwardly until the mass 69 is balanced against the reduced radiation pressure and, of course, the scale will move along the pointer in a direction to indicate a decrease in radiation pressure.

It is therefore apparent that the present invention provides a measuring instrument which can be calibrated the same from instrument to instrument. Since the linkage mechanism of each instrument can be properly counterbalanced by weight 73, independently of any differences in instruments, each instrument will operate directly against pendulous weight 69 and since these weights and the pendulum arms can be the same in all instruments, the pointer 75 of all instruments will move the same amount upon changes in sound pressure and the same scale calibration can be utilized for all instruments. Further, the zero calibration of each instrument can be quickly accomplished independently of the linkage mechanism and pendulous weight of each instrument, by adjustment of the screw 88 to move the casing relative to the linkage mechanism. It is apparent that the sensitivity of the instrument can be easily changed by varying the mass of weight 69 or by varying the torque arm for the weight. Since the measurements of the instrument are solely against the force of gravity rather than against other resistance means, such as springs, it is apparent that a highly reliable and accurate resistance means is utilized in the invention. By positioning the sides of the target member at 45 degrees to the direction of pressure radiation, it is possible to measure the true sound pressure directly and calibrate the sale in terms of the force of weight 69. The horizontal component of movement of the target and any change in position of the radiation field causes a change in the point of application of the sound pressure to the target. However, because of the fact that the supporting arm for the target is incorporated as one arm of a parallelogram linkage, the radiation pressure is applied to the linkage at the pivot point supporting the target and changes in the point of application of sound pressure on the target does not change the effective torque and does not introduce errors in the readings. Further, the instrument is easily calibrated by placing weights which are equivalent to watts on the target and the sale can be located with respect to the pointer in the proper position. It is contemplated that various linkage mechanisms can be utilized to support the target member since the only requirement for such a linkage mechanism is that the target member retain a fixed orientation with respect to the wave front during its movement and be capable of being counterbalanced. Various other modifications are contemplated by those skilled in the art without departing from the spirit and scope of the invention as hereinafter defined by the appended claim.

What is claimed is:

An instrument for measuring sound radiation pressure comprising a casing filled with a sound-conducting liquid and having a portion permeable to sound for transmitting sound pressure into the interior of said casing, a parallelogram linkage mechanism suspended within said liquid comprising four rigid links pivotally connected together with a maximum of two of the pivot points fixed to said casing and one of the links rigid with the casing, a target member located within said casing opposite said portion to receive the radiation pressure and supported by one of said links for movement relative to said portion without changing its orientation with respect to the field of sound radiation, inertia means supported by a first arm secured to said linkage mechanism at one of said pivot points for producing a reacting force on said linkage mechanism in a direction opposed to that of the sound radiation pressure, measuring means carried by said casing, indicator means movable by said linkage mechanism and cooperating with said measuring means for indicating the intensity of the sound radiation pressure, said indicator means being supported by a second arm secured to said linkage mechanism at said one fixed pivot point, and a counterweight attached to said linkage mechanism for counterbalancing all forces about said fixed pivot point except the force of said inertia means and the sound radiation pressure on said target means so that said measuring means indicates the transmitted sound pressure, said counterweight being supported by a third arm secured to said linkage mechanism at said one fixed pivot point, the radiation pressure experienced by said target member being transmitted to said linkage mechanism at the pivot point for said target supporting link so that changes in the position of application of radiation pressure on the target member will have no effect on the indicated radiation pressure.

References Cited in the file of this patent
UNITED STATES PATENTS

| | | |
|---|---|---|
| 1,492,654 | Sirch | May 6, 1924 |
| 2,531,844 | Fiedler | Nov. 28, 1950 |

FOREIGN PATENTS

| | | |
|---|---|---|
| 245,411 | Switzerland | July 16, 1947 |